(12) United States Patent
Mosse

(10) Patent No.: US 6,565,124 B2
(45) Date of Patent: *May 20, 2003

(54) PIPE JOINT AND A GASKET THEREFOR

(75) Inventor: Richard Wolfgang Emil Mosse, London (GB)

(73) Assignee: Beckswift Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/882,957

(22) Filed: Jun. 15, 2001

(65) Prior Publication Data

US 2002/0003348 A1 Jan. 10, 2002

Related U.S. Application Data

(63) Continuation-in-part of application No. 09/180,797, filed as application No. PCT/GB97/01332 on May 15, 1997, now Pat. No. 6,267,414.

(30) Foreign Application Priority Data

May 17, 1998 (GB) ............................................. 9610392

(51) Int. Cl.[7] ................................................. F16L 35/00
(52) U.S. Cl. ........................ 285/24; 285/350; 285/354; 285/363; 277/603; 277/608
(58) Field of Search .................................. 285/354, 368

(56) References Cited

U.S. PATENT DOCUMENTS

| | | |
|---|---|---|
| 2,926,937 A | 3/1960 | Parsons |
| 3,054,627 A | 9/1962 | Ligon |
| 4,296,954 A | 10/1981 | Fujimaki et al. |
| 4,601,498 A | 7/1986 | Haugen |
| 4,653,724 A | 3/1987 | Garriques et al. |
| 4,705,307 A | 11/1987 | Chelette |
| 4,930,791 A * | 6/1990 | Ungchusri et al. ........... 277/151 |
| 5,340,170 A | 8/1994 | Shinohara et al. |
| 5,492,336 A | 2/1996 | Barna et al. |
| 5,518,257 A | 5/1996 | Breaker |
| 5,551,706 A | 9/1996 | Barna et al. |

(List continued on next page.)

FOREIGN PATENT DOCUMENTS

| | | |
|---|---|---|
| DE | 556 982 C | 8/1932 |
| DE | 31 05 395 A1 | 11/1982 |
| DE | 3 717 781 | 12/1988 |
| DE | 41 30 593 A1 | 3/1993 |
| DE | 42 01 535 A1 | 7/1993 |
| DE | 195 14 003 A1 | 11/1995 |
| EP | 0 327 714 A2 | 8/1989 |
| EP | 0 393 303 A2 | 10/1990 |
| GB | 1 317 685 | 4/1973 |

OTHER PUBLICATIONS

Burton, H., Ultra–High–Temperature Processing of Milk and Milk Products, London; New York: Elsevier Applied Science, pp 232–233, 1988.
Baumbach et al., Hygienic Pipe Couplings, European Hygienic Equipment Design Group, Feb. 1995.

Primary Examiner—Lynne H. Browne
Assistant Examiner—Giovanna Collins
(74) Attorney, Agent, or Firm—Fulbright & Jaworski L.L.P.

(57) ABSTRACT

A gasket 17 for a demountable pipe joint 1 of an hygienic food processing system, the gasket 17 comprising a first part 19 defining a surface 27 for providing a smooth transition from a first pipe end 3 to a second pipe end 5 at a pipe joint 1, the sides of the gasket 17 each defining a plateau 25 adjacent the surface 27 for abutting the pipe ends 3, 5, in use, to produce an hygienic seal, wherein the first part 19 of the gasket 17 is made from a plastics material having sufficient structural strength when not fully supported to withstand pressures within the pipes 3, 5, during use, without damaging or separating from the pipe ends. Such a gasket has been found to be extremely efficient and appropriate in hygienic food processing systems, which in the past have relied heavily on elastomeric gaskets.

18 Claims, 6 Drawing Sheets

U.S. PATENT DOCUMENTS

| | | |
|---|---|---|
| 5,553,902 A | 9/1996 | Powers |
| 5,758,882 A | 6/1998 | Torzewski |
| 5,839,765 A | 11/1998 | Carter et al. |
| 5,855,397 A | 1/1999 | Black et al. |
| 5,876,070 A | 3/1999 | McNealy et al. |
| 5,944,319 A | 8/1999 | Kohlman |
| 5,947,533 A | 9/1999 | Fisher et al. |
| 5,954,375 A | 9/1999 | Trickle et al. |
| 5,979,910 A | 11/1999 | Shinohara et al. |
| 5,997,008 A | 12/1999 | Pflug |
| 6,042,121 A | 3/2000 | Ma et al. |
| 6,267,414 B1 * | 7/2001 | Mosse .................. 285/24 |

* cited by examiner

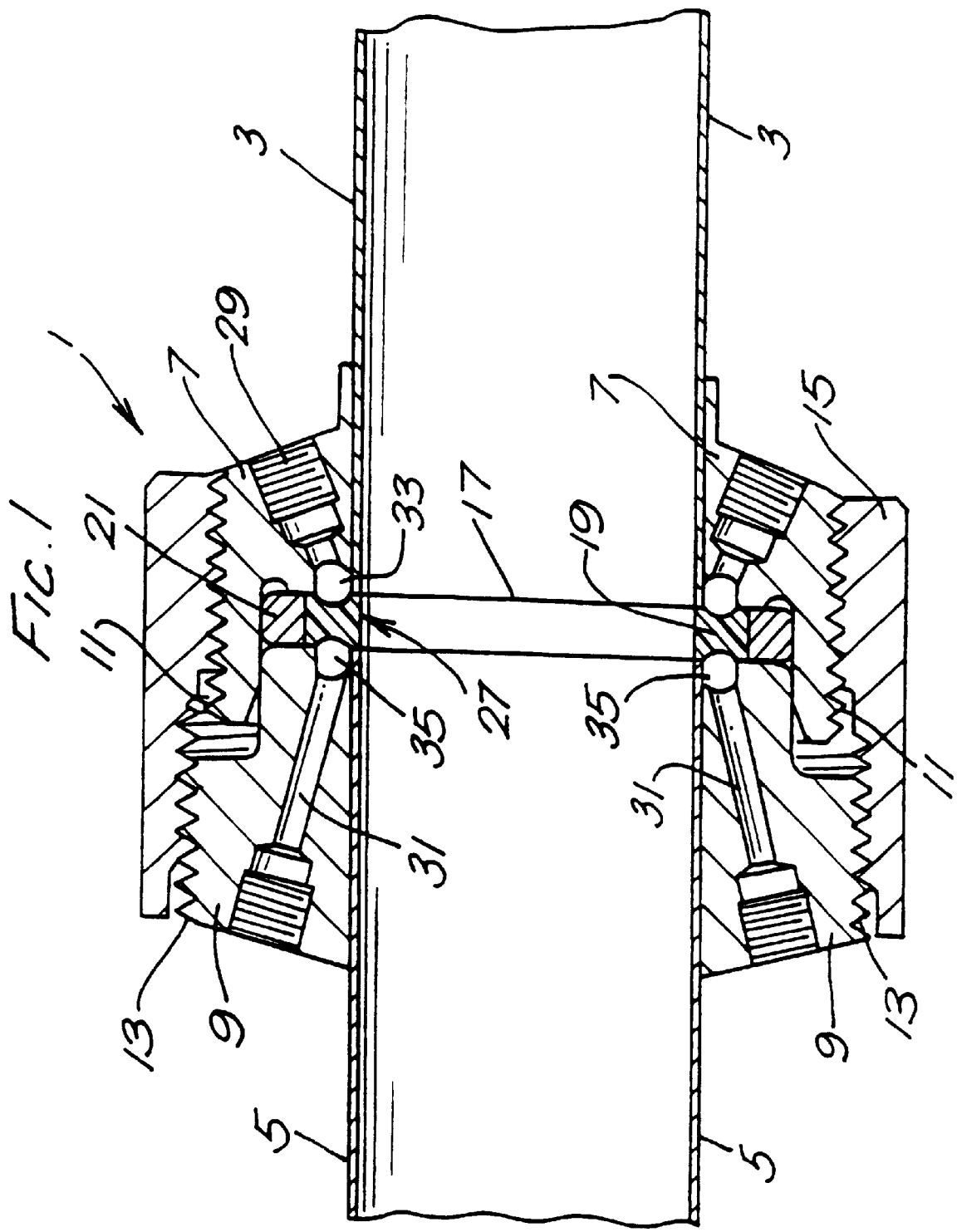

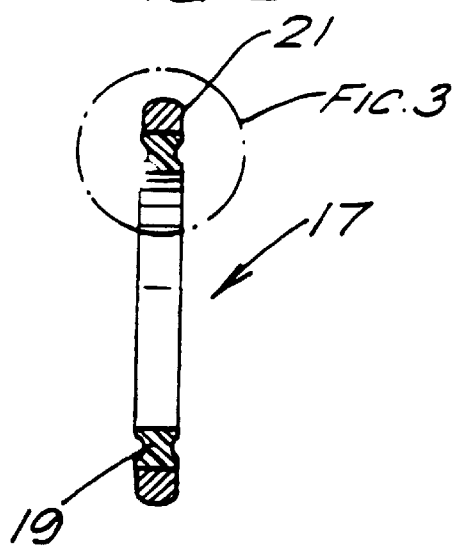
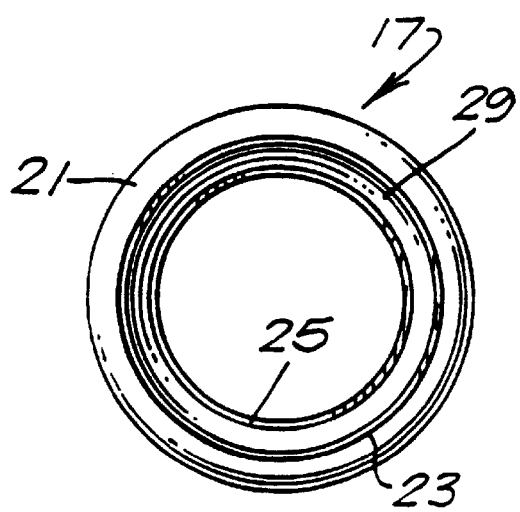
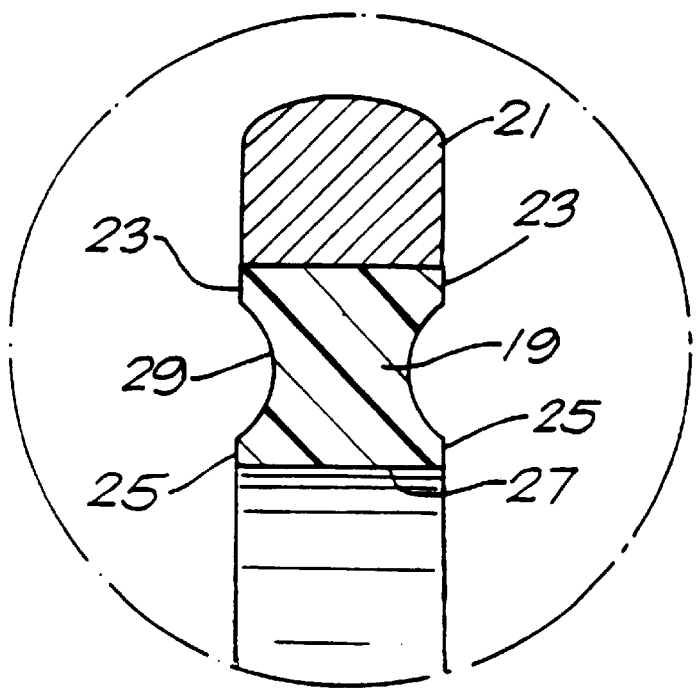

PIPE JOINT AND A GASKET THEREFOR

CROSS-REFERENCE TO RELATED APPLICATIONS

The present application is a continuation-in-part of U.S. patent application Ser. No. 09/180,797 filed Feb. 12, 1999, entitled "Pipe Joint and a Gasket Therefore," filed May 15, 1997 now U.S. Pat. No. 6,267,414, as PCT application serial number PCT/GB97/01332 designating the United States and claiming priority to Great Britain patent application serial number 9610392.4 filed May 17, 1996, the disclosures of which are hereby incorporated herein by reference.

TECHNICAL FIELD OF THE INVENTION

This invention relates to gaskets, and in particular to a gasket for a demountable pipe joint of an hygienic food processing system.

BACKGROUND OF THE INVENTION

Systems and apparatus for the processing of liquid food inevitably require joints between adjacent pipes of the apparatus. Although pipes can be joined by welding, they can not then be readily disassembled for cleaning and other purposes.

In view of the foregoing, demountable pipe joints are preferred in many applications, although it is recognized that such joints (i.e. joints that are not welded together but can be assembled and disassembled) are unsatisfactory from a hygienic point of view. Problems associated with demountable pipe joints are discussed in a paper by the European Hygienic Equipment Design Group entitled "Hygienic Design of Closed Equipment for the Processing of Liquid Food" by G. J. Curiel, Dr. G. Hauser, P. Peschel and D. A. Timperley dated October, 1993. In this document, various types of pipe joint incorporating elastomeric gaskets are discussed. As a result, in general, it is clear that gaskets, whether in the form of sheets, moldings or "O" rings, which are usually made of elastomer such as Neoprene rubber, EDPM or Viton, are not ideal. These known prior art gaskets are used because they deform to take the shape of the mating surfaces when relatively small forces are applied. However, these gasket materials "creep", particularly at high temperatures, and compress or move readily during use in response to the pressure of liquid food in the pipe of the processing apparatus.

If a gasket exhibits "creep" (—creep means a time dependent change of relaxed dimensions after having been subject to heat and/or pressure), the pressure between the gasket and a mating face of a pipe end at a joint can be lost and crevices can open up. As a result, micro organisms can become established in the crevices, thereby preventing the pipe joint remaining sterile. Furthermore, problems with micro organisms can be especially bad when using elastomeric gaskets because the food processing equipment usually goes through cycles of heating and cooling during long production runs and the micro organisms can easily flourish in crevices as the soft elastomeric gasket moves in its seat.

Another problem associated with elastomeric gaskets is that, when a pipe needs to be sterilized before a new production run is commenced, temperatures between 122° and 140° (for example) need to be applied, often by means of superheated pressurized water or steam to kill any micro-organisms present. If there are crevices present then the sterilizing agent may not contact the entire surface. Heating elastomers to this sort of temperature, however, results in degradation of the material, thereby shortening the life of the gasket.

U.S. Pat. No. 5,518,257 discloses a seal device which incorporates an inner seal member made from engineering plastics and resiliently biased towards a flow path. The inner seal member is designed to slide relative to pipe ends of a joint and includes a sharp internal corner, both of which are inherently unsatisfactory in hygienic applications due to their ability to harbor micro-organisms.

Although metal gaskets are known in certain applications, these are not considered appropriate in food processing apparatus because they can result in scars and scratches being produced on the pipe ends which, when a new gasket is applied, will prevent a satisfactory seal being produced.

Although the problems described above have been known for many years in the field of hygienic food processing equipment, as far as the applicant is aware no one has provided a satisfactory answer until now.

BRIEF SUMMARY OF THE INVENTION

With the foregoing in mind, the present applicant has invented a new demountable pipe joint and gasket suitable therefor which overcome the problems associated with the prior art in a simple and efficient manner. Furthermore, although the present invention appears to go against all teachings of the prior art in this particular specialized field, it provides a significant improvement over the prior art.

According to the present invention, there is provided an apparatus for use in a hygienic food processing system, comprising a gasket made substantially of engineering plastics material, wherein said engineering plastics material is selected to be resistant to creep during said gasket's use in said hygienic food processing system. According to a preferred embodiment the gasket comprises a bore surface for providing a transition from a first joint part to a second joint part at a demountable joint of said hygienic food processing system, and a side defining a seal surface, adjacent the bore surface, for abutting at least one of said first and second joint parts, wherein said seal surface deforms in use to define a plateau positioned on a nib which extends from a body of the gasket. In use the gasket produces an hygienic seal.

As will be appreciated, a gasket according to the present invention is a significant departure away from known prior art gaskets of the relevant type, which in general were elastomeric and soft. Furthermore, although particularly applicable to hygienic food processing systems, a gasket according to the present invention may be used in any demountable joint or other appropriate application. For example, the invention may find significant uses in the biotechnology or pharmaceutical industries where cleanliness is required.

Although those skilled in the art will understand the significance of the present invention, in particular the difference between elastomers and engineering plastics, the distinction can be clearly recognized from the differences in relative tensile strength/modulus. In particular, a typical elastomer has a tensile strength of 20–40 MPa and an elongation of 300–700% before breaking. This implies a tensile modulus of less than 10–20 MPa. In contrast, a typical engineering plastic has a tensile strength of 100–200 MPa and an elongation of 3–100%, thereby giving a tensile modulus in the range of 2400–10,000 MPa at room temperature. Further, a typical elastomer exhibits between 2–3 times as much linear thermal expansion (and hence between 8–27 times as much volume expansion) as an engineering plastics such as polyetheretherketone.

Preferably each seal surface is positioned on a nib or platform which extends from a body of the gasket. In a particular embodiment, wherein the gasket is substantially annular, each nib is also substantially annular.

In a preferred embodiment, each seal surface includes a deformable ridge for mating with imperfections in a joint part during production of the hygienic seal.

In an alternative embodiment, each pipe end may include a raised platform portion for gripping a simply shaped gasket, such that the raised platforms of the pipe ends replace the nibs of the gasket.

The nibs are preferably shaped and sized to exhibit creep during assembly of a joint, such that deformation of the nibs results in an extremely good seal being produced between the gasket and the adjacent joint part.

The body of the gasket is preferably shaped and sized to remain resilient (i.e. elastic) throughout the lifetime of the gasket. With this in mind, provided that the compression force applied to the gasket does not exceed the critical stress (in this specification, "critical stress" means the maximum stress at which no relatively rapid permanent deformation occurs) of the particular plastics material forming the gasket, the body of the gasket can remain resilient such that the nibs of the gasket are continually biased into contact with the joint parts. This preferably applies at all times and at all working temperatures experienced by the gasket.

The radial width of each seal surface of the gasket may be less than 50%, preferably less than 22%, more preferably about 20%, of the radial width of the body of the gasket. Further, the axial length of each nib is preferably less than 5%, more preferably less than 2%, of the total axial length of the gasket. By using these preferred relative dimensions, normal usage of the gasket results in the nibs experiencing creep during assembly of a joint and the body of the gasket remaining resilient throughout the assembly and subsequent lifetime of the joint, thereby keeping the deformed portion in contact with the joint part and thus the seal tight despite thermal cycling. A markedly improved seal is thereby provided which should not require any subsequent tightening of the joint.

The gasket may include a stop for defining the maximum compression of the gasket during use. The stop may be made of metal, possibly stainless steel, ceramic or plastics material. If the stop if made of plastics, it may be formed integrally with the gasket and take the form of an annular outer portion of the gasket which defines oppositely facing planar surfaces.

The gasket may include a metal fence which defines the maximum radial extent of the gasket. If a fence is employed, the fence may be a stainless steel ring which abuts the gasket and acts as the stop mentioned above. As a result, the inner plastics part of the gasket cannot expand radially, but can expand axially if necessary. The amount of expansion will, however, be minimal in comparison to the prior art elastomeric gaskets.

Preferably the sides of the gasket adjacent the fence define raised surfaces which extend further axially than the fence. As a result, when the gasket is positioned for use and compressed in a pipe joint, for example, the fence acts as the stop and the plastics part of the gasket can only be compressed by a predetermined amount dictated by the axial height of the raised surfaces.

An annular trough may be formed on each side of a gasket between the plateau and the raised surface. Alternatively, in use, a cavity may be defined around this region of the gasket. In any event, in this region, the gasket is unsupported and allows expansion of the gasket, if necessary.

The plastics material of the gasket is preferably resistant to creep at temperatures encountered during use. In particular, the plastics material is preferably resistant to creep up to about 140° C. It is envisaged that a gasket according to the present invention is likely to be used in a pipe joint which may be exposed to sterilization temperatures of between 122° C. and 140° C., and may undergo many thermal cycles.

Preferably the plastics material of the gasket is a hard plastic, such as polyetheretherketone (PEEK), polyethersulfone (PES), TORLON (Trade Mark), a polyamide-imide, or a polycarbonate. Other hard/tough plastics, such as polyphenylsulfone (e.g. RADEL from Amoco), Liquid Crystal Polymer (e.g. VECTRA from Hoechst, or ZENITE from Dupont) or polyimide (e.g. VESPEL from Dupont), known to those skilled in the relevant art may also be used, if appropriate.

Although it may ultimately not be the preferred form of gasket according to the invention, it is envisaged that the gasket may be made solely of PEEK or other hard/tough plastics material. Furthermore, such a gasket may be used not only in a pipe joint, but also in or as part of a housing or body of a valve, a pump or a heat exchanger, for example.

According to another aspect of the present invention, there is provided a pipe joint of an hygienic food processing system comprising a first pipe end, a second pipe end and a gasket as claimed herein compressed between the two pipe ends.

The pipe ends may be urged together by means of flanges soldered onto the outsides of the pipes. By soldering the flanges onto the pipes, welding at the pipe joint can be avoided altogether. As a result, the significant temperatures associated with welding are not needed, thereby preventing damage to the pipes themselves, which may be made from high grade austenitic stainless steel.

When using flanges soldered on the outsides of the pipes, contact between the soldering metals (possibly tin based) and food products passing through the pipes is best avoided. This can be readily achieved using a gasket according to the present invention, which does not move significantly during use yet provides a reliable seal against material from within the pipes reaching the flanges on the outsides of the pipes. Hence, the advantages of soldering the flanges onto the pipes can be realized.

Preferably alignment of the pipe ends is controlled by the flanges. As will be appreciated, if the thickness of a pipe wall is only between 1.2 and 1.6 millimeters, it can be extremely difficult to align a gasket accurately with the pipe ends. Furthermore, producing a good seal between two thin pipe walls and an elastomeric gasket is extremely difficult to achieve. The present invention clearly assists in overcoming such problems. With this in mind, an inside surface of one of flanges preferably assists in aligning the gasket.

In one embodiment, the flanges may be drawn together by means of a screw thread. Any other appropriate means for closing the pipe joint can, of course, be envisaged by those skilled in the relevant art.

BRIEF DESCRIPTION OF THE DRAWINGS

Specific embodiments of the present invention are now described, by way of example only, with reference to the accompanying drawings, in which:

FIG. 1 is a sectional side view through a de-mountable pipe joint;

FIG. 2 is a sectional side view showing the gasket used in the pipe joint of FIG. 1;

FIG. 3 is an enlarged view of the part ringed in FIG. 2;

FIG. 4 is a view in the axial direction of the gasket of FIG. 2;

DETAILED DESCRIPTION OF THE INVENTION

Figure 5:
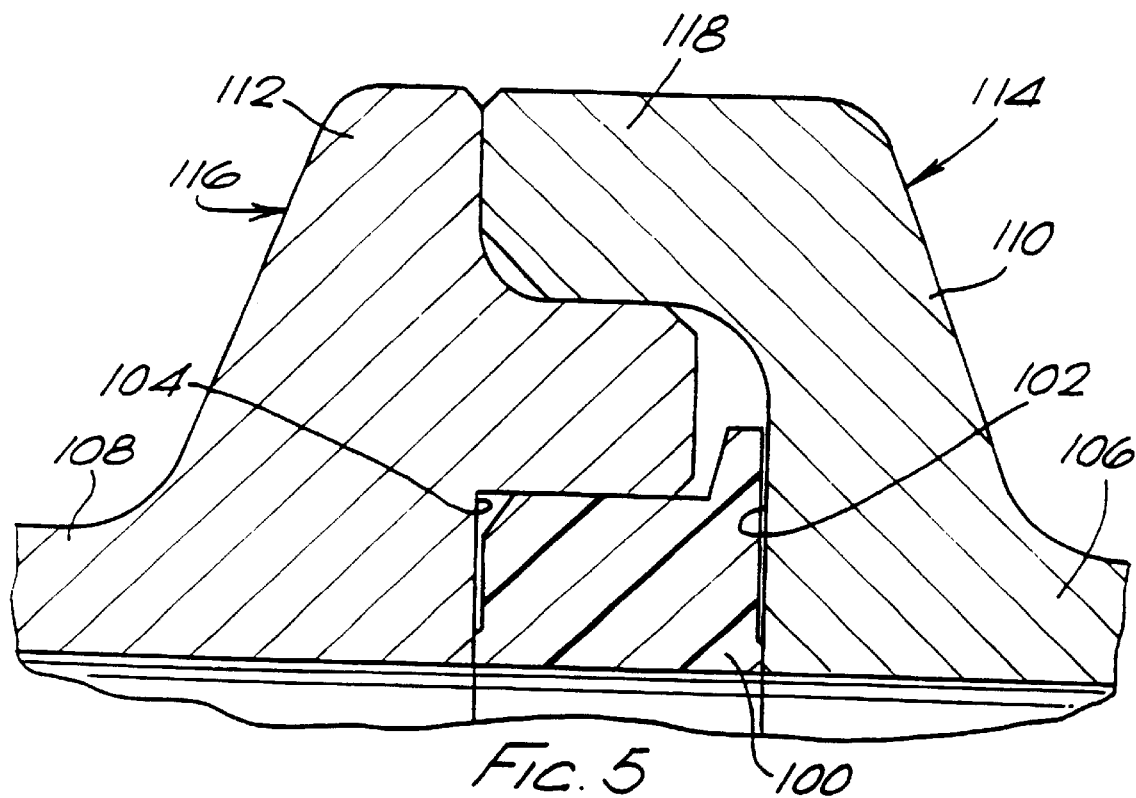
FIG. 5 is a sectional side view of part of a second de-mountable pipe joint.

With reference to FIG. 1 of the drawings, a de-mountable pipe joint 1 of an hygienic food processing system is shown. The pipe joint 1 joins the ends of two adjacent flow pipes 3,5. Each pipe carries a flange 7,9 adjacent its end which is soldered to the outside of the pipe 3,5. In the embodiment shown, each flange 7,9 includes an outer screw thread 11,13 which mates with a ring nut 15 as shown. Although not necessarily the preferred way of drawing the two pipe ends together, the ring nut 15 can have two threads of different pitches for engaging the screw threads 11,13 of the two different flanges 7,9. As a result, rotation of the ring nut 15 can draw together or separate the two flanges 7,9 in an accurate fashion. Other ways of securing the two flanges 7,9 together, such as by using a chamfered clamping ring tightened by a wing (or butterfly) nut, can of course be envisaged by those skilled in the relevant art.

A gasket 17 is positioned between the ends of the pipes 3,5 and the flanges 7,9. As seen more clearly in FIGS. 2–4, the gasket 17 is annular in shape and comprises an inner ring 19 of polyetheretherketone (PEEK) or any other appropriate plastics material having significant structural strength so that it does not move significantly as a result of pressure within the pipes 3,5 during use. The plastics material must, however, be soft enough for it to deform to the metal surfaces of the pipe ends to form hygienic and reliable seals therewith. Furthermore, the plastics material must be very resistant to creep at the temperature and cycling operations experienced in hygienic food processing systems, namely up to perhaps 140° C. during sterilization. Additionally, the gasket material must be inert to chemical reaction with cleaning and sterilizing materials, and with food products passing through the pipes 3,5.

An outer ring 21 of stainless steel abuts the plastics ring 19, as shown more clearly in FIG. 3. As can also be seen in FIG. 3, the inner plastics ring of the gasket 17 includes raised surfaces 23 adjacent the metal ring 21. As a result, during closing of the pipe joint 1, the flanges 7,9 bear against the raised surfaces 23 and compress the plastics ring 19 to form an hygienic seal before the stainless steel ring 21 acts as a stop against the compression. The stainless steel ring 21 may also prevent the plastics ring 19 from bursting outwards in the event of an extremely high pressure within the pipes 3,5.

An annular plateau 25 is also formed on each side of the plastics ring 19 adjacent an inside surface 27 of the gasket 17. As will be appreciated, the inner surface 27 allows a smooth transition from the inner surface of the first pipe 3 to the inner surface of the second pipe 5, as shown in FIG. 1. Further, the two plateaux 25 have widths corresponding to the thickness of each pipe 3,5, so that the pressure applied to the gasket 17 by each pipe end as the pipe joint 1 closes is focused onto the corresponding plateau 25, thereby maximizing the sealing pressure and forming an excellent hygienic seal.

Between the plateaux 25 and the raised surfaces 23, a trough 29 is formed in each side of the plastics ring 19. During use, in this area, the gasket 17 is unsupported, thereby providing free space into which the plastics ring 19 can expand its volume during heating without pushing the inner surface 27 (i.e. the product contacting surface) out into the flow of the product. Although it is true that an additional degree of pressure will be applied to the plateaux 25 by the pipe ends and to the raised surfaces 23 by the steel ring 21 due to the fact that the plastics will expand to a greater extent than the surrounding metal during heating, the free space adjacent the plateaux 25 and raised surfaces 23 allows the plastics ring 19 to accommodate this additional pressure without causing premature aging of the material.

As can be seen in FIG. 1, the flanges 7,9 can be made accurately to hold the gasket 17, which is relatively rigid, with a tight fit, thereby ensuring that the gasket 17 aligns accurately with the pipe ends. This is a distinct and marked improvement over prior art gaskets using elastomeric material, which can easily become deformed during installation.

As can also be seen in FIG. 1, ducts 29,31 are formed in the flanges 7,9. These ducts allow access to the free space 33,35 adjacent the plastics ring 19 of the gasket 17, thereby enabling the pipe joint to be checked for leaks. Further, sterilizing steam or water, perhaps at high pressure for example, can be applied to the gasket 17 behind the plateaux 25 to kill off any micro-organisms which happen to accumulate there. Hence, micro-organism cannot hide from the sterilization process going on within the pipes 3,5 simply by hiding behind the hygienic seal formed at the plateaux 25.

Finally, as can be seen in FIG. 3, the plateaux 25 and raised surfaces 23 can be made with essentially the same height, thereby ensuring that the two regions are compressed to a similar extent during closing of the pipe joint 1.

Figure 6:
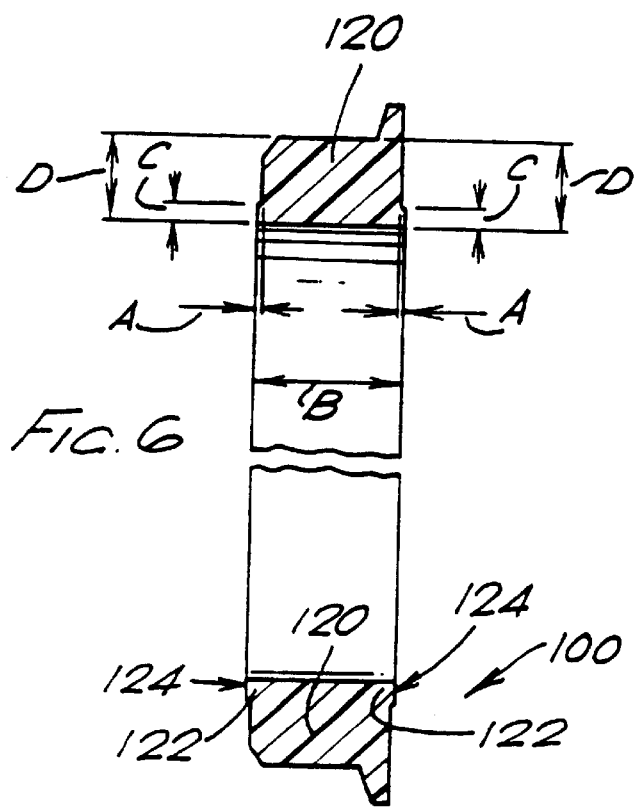
FIG. 6 is an enlarged view of the gasket part shown in FIG. 5.

Turning now to the second embodiment shown in FIGS. 5 and 6, an annular gasket 100 is held between end faces 102,104 of pipes 106,108. Integral flanges 110,112 are formed at the ends of the pipes 106,108. The flanges 110,112 define chamfered surfaces 114,116 which are engaged, in use, by a clamping ring (not shown) which can be tightened using a butterfly or wing nut to draw the two flanges 110,112 together to compress the gasket 100 between the pipe ends. The maximum compression of the gasket 100 is, however, dictated by a mechanical stop which takes effect when an extension 118 of flange 110 abuts against flange 112, as shown in FIG. 5.

The gasket 100, which is shown more clearly in FIG. 6, is annular and includes a body portion 120 and two nib (or raised platform) portions 122 for abutting the end faces 102,104 of the pipes 106,108. Each nib portion 122 defines a plateau surface 124 which conforms to any surface imperfections in the end faces 102,104 of the pipes 106,108 during assembly of the pipe joint. More particularly, the plastics material from which the gasket 100 is manufactured in one piece is chosen such that the nib portions 122 exhibit creep during assembly of the pipe joint as the two pipes 106,108 are drawn together by the clamping ring. In contrast, the body portion 120 of the gasket 100 remains resilient throughout the assembly of the pipe joint and its subsequent lifetime, thereby acting as a spring to bias the nib portions 122 continually into contact with the end faces 102,104 of the pipes 106,108. Hence, although not every hard plastics material can satisfy these requirements, those that can provide an excellent gasket for hygienic use. As stated above, a particularly appropriate plastics material for this application is polyetheretherketone (PEEK).

To enable the plastics material of the gasket 100 to act in the desired fashion, with the nib portions 122 exhibiting creep during installation and the body portion 120 remaining resilient, relative dimensions of the nib portions 122 and the body portion 120 are important. In particular, the applicants have found that the radial width (C) of each plateau surface 124 must be less than 50%, more preferably about 20%, of the total radial width (D) of the body portion 120. Further, the axial length (A) of each nib portion 122 should be less than 5%, more preferably less than 2%, most preferably about 1.875% of the axial length (B) of the body portion 120. By following these relative dimensions, the resilience of the body portion 120 can accommodate the expansion and contraction of the gasket 100 during heating and cooling of the gasket 100 during normal usage in an hygienic processing system without allowing crevices or cavities to open up between the plateau surfaces 124 of the nib portions 122 and the end faces 102,104 of the pipes 106,108.

The mathematics which explain the allowable changes in relative length of the body portion 120 and the nib portions 122 is given in Appendix A hereinafter.

Turning now to FIGS. 7a–7d, a cross-section of one side of a third embodiment of gasket 200 between pipe ends is shown during closing of a pipe joint. FIG. 7a shows a gasket before compression, FIG. 7b shows the gasket following compression by 0.001 inch, FIG. 7c shows the gasket following compression by 0.002 inch and FIG. 7d shows the gasket following compression by 0.003 inch. As can be seen clearly in FIG. 7a, this embodiment of gasket 200 comprises a bore surface 202 and an adjacent pair of non-flat seal surfaces 204. In fact, each seal surface includes an annular ridge 206 which, whenever compressed, deforms and mates with imperfections in the surface of the adjacent joint part to assist in producing a high quality hygienic seal.

As can be seen more clearly in FIGS. 7b–7d, as the pipe ends 208 are brought together, each seal surface 204 is compressed and deforms to define a plateau 210 on a nib 212 which extends from a body portion 214 of the gasket 200. More particularly, as the gasket 200 is compressed by 0.002 inch, a nib defining a plateau having a width of approximately 0.0055 inch is produced in this particular embodiment. As a result, an extremely reliable hygienic joint is formed between the metal pipe ends and the engineering plastics material gasket 200.

As discussed above, the nibs 212 exhibit creep during formation of the plateau 210. In contrast, the body portions 214 of the gasket 200 remain elastic (resilient) throughout, thereby acting as a spring to bias the nib portions 212 (and hence the seal surfaces 204) continually into contact with the end faces of the pipes. This applies even though the pipe joint may be exposed to thermal cycling during use.

Figure 8:
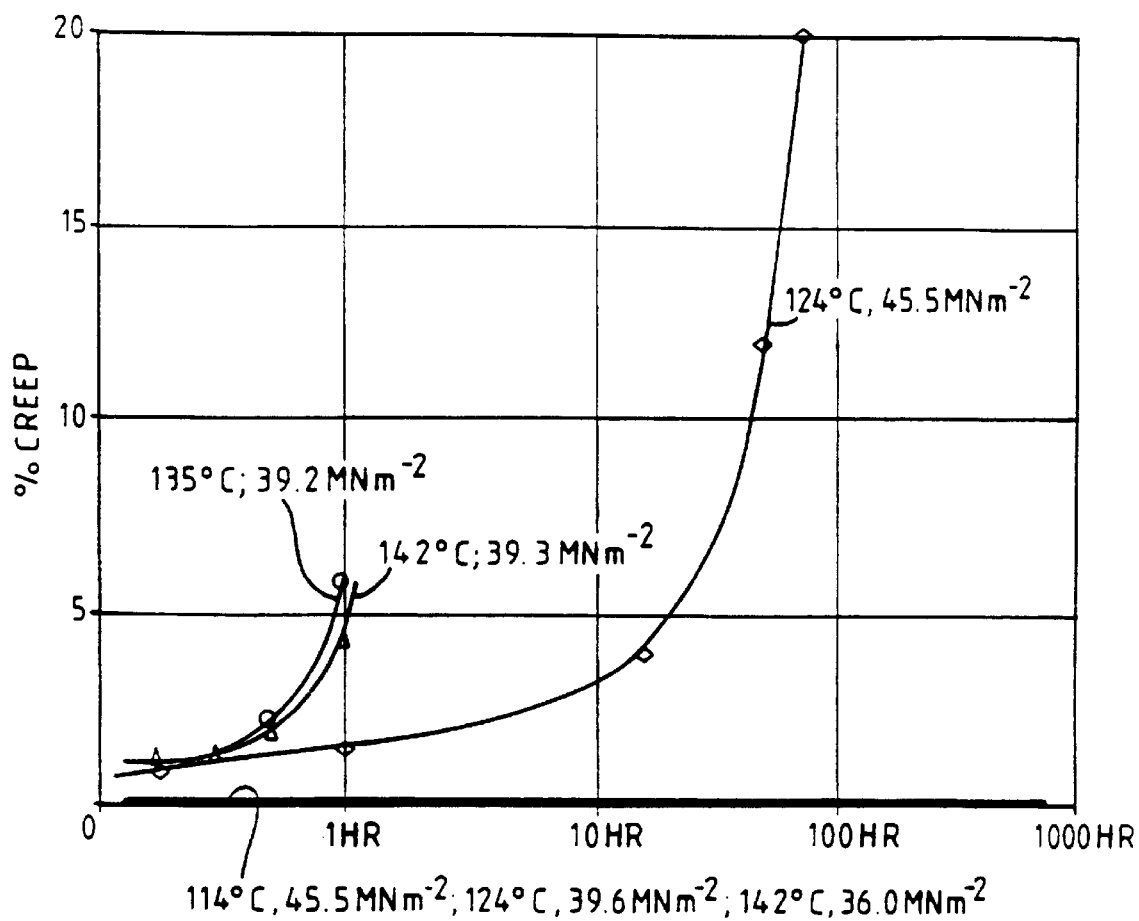
FIG. 8 is a graph showing the percentage of creep exhibited by PEEK at various temperatures and stresses.
Figure 9:
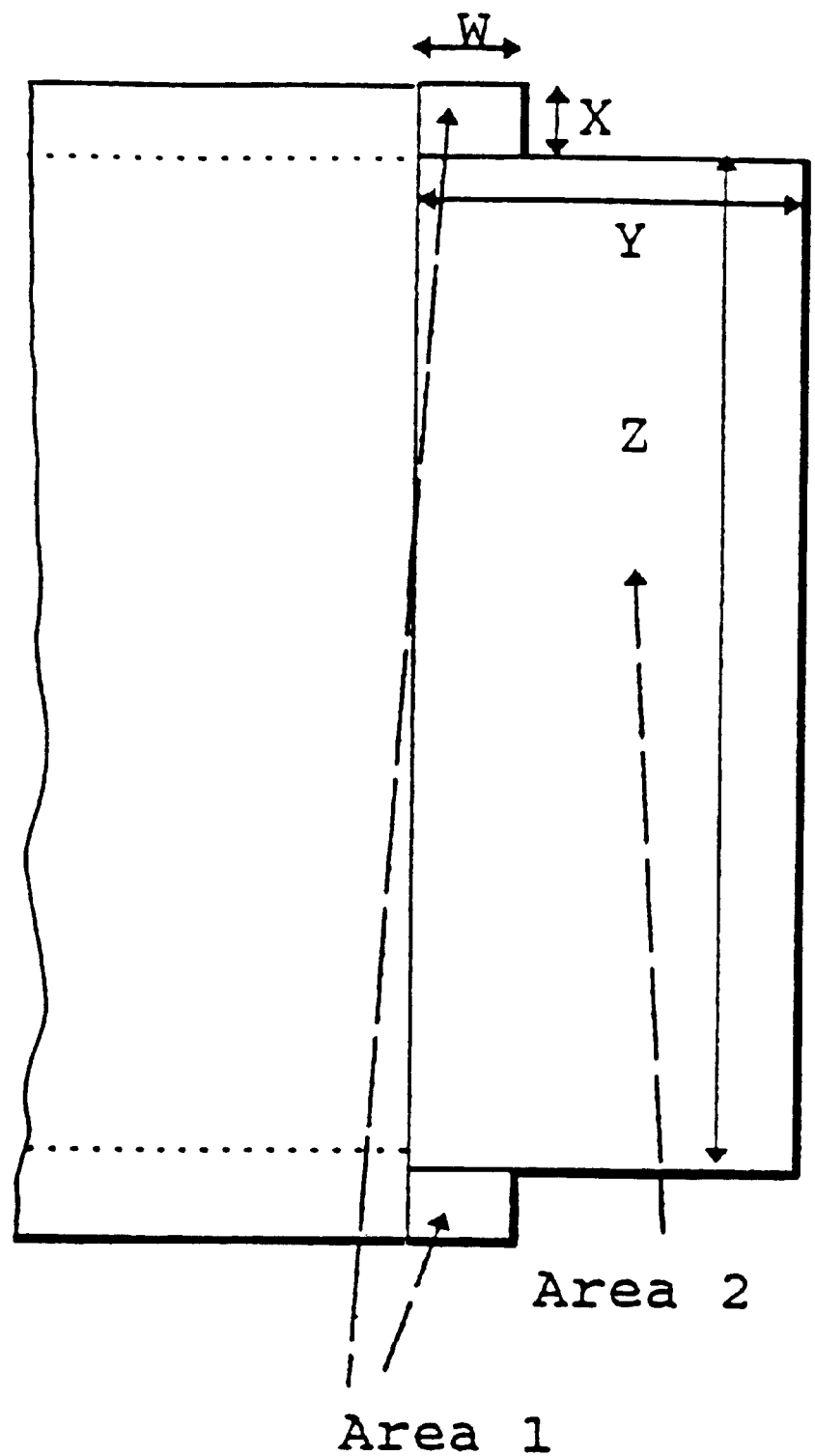
FIG. 9 is a seal cross-section with various dimensions and areas labeled, as discussed in Appendix A.

As discussed above, polyetheretherketone (PEEK) is a particularly good plastics material for a gasket 100 according to the present invention. Reasons for this can be appreciated from the graphs shown in FIG. 8 of the drawings. As can be seen in FIG. 8, substantially no creep occurs at the following temperatures and stresses:

114° C. and 45.5 MNm$^{-2}$
124° C. and 39.6 MNm$^{-2}$
142° C. and 36.0 MNm$^{-2}$ With this in mind, as mentioned previously, an hygienic food processing system may operate between room temperature and up to about 140° C. during sterilization.

However, if the temperature and/or stress is increased over a threshold, as evidenced by conditions such as 124° C. and 45.5 MNm$^{-2}$
135° C. and 39.2 MNm$^{-2}$
142° C. and 39.3 MNm$^{-2}$ a significant amount of creep is exhibited over a relatively short period of time. Thus, PEEK exhibits a sharp change from an elastic region with very limited creep to a plastic region with substantial rapid creep. Using these characteristics, the gasket 100 can be designed to allow the nib portions 122 to exhibit creep during assembly of a joint, thereby producing an excellent seal between the gasket 100 and the end faces 102,104 of the pipes 106,108, whilst the body portion 120 of the gasket 100 remains resilient throughout its lifetime because it does not exhibit creep to any significant extent.

It will of course be understood that the present invention has been described above purely by way of example, and that modifications of detail can be made within the scope of the appended claims.

APPENDIX A

Plastics do not exhibit a sharply defined elastic limit or critical stress below which there is only elastic deformation and no plastic deformation or creep. The plastic flow generally just becomes slower and slower as stress is reduced. However, the tail off of the rate is such that at limited strains and limited stresses, to a first approximation, some hard engineering plastics such as PEEK behave elastically—in other words, they generally recover their original shape when the strain and stress are removed.

For the purposes of this discussion, we take the critical stress value as being he stress below which there is no relatively rapid permanent deformation of the parts. This means in practical terms that changes in dimension due to thermal cycling and compression do not lead to a loss of pre-compression which would make the pre-compression less than that required to maintain a pressure-tight joint at the design working pressures. Hence changes of size should be at maximum a fraction of the pre-compression or unconstrained thermal expansion of the part, whichever is smaller.

Figure 7:
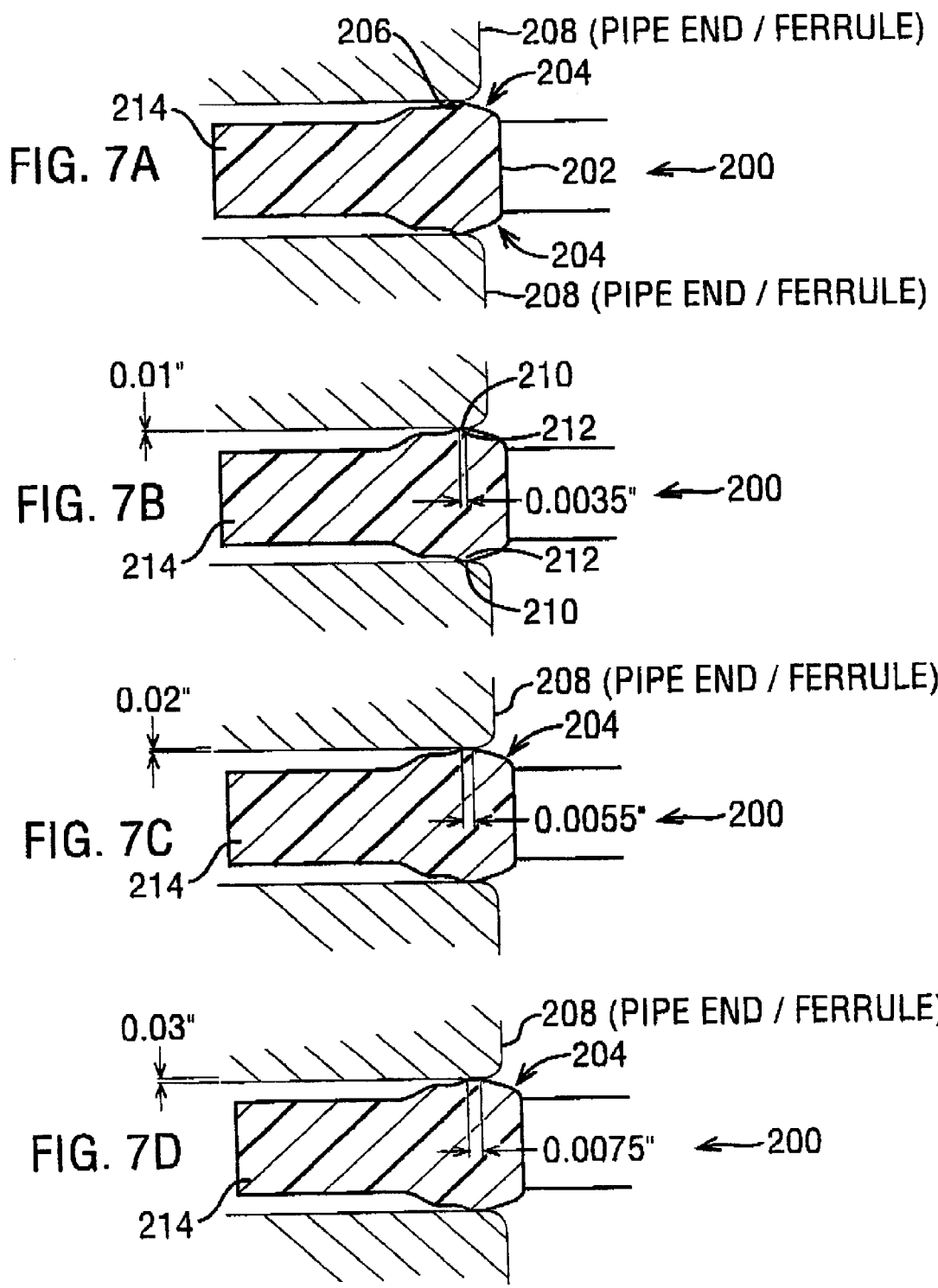
FIGS. 7a, 7b, 7c and 7d are schematic sectional side views of part of a third demountable pipe joint during closing of the joint.

FIG. 7 of this specification shows some results of trials with PEEK. In particular, FIG. 7 shows that at 124° C., a PEEK component will support a stress of 39.6 MN/m$^2$ without significant creep, and will creep rapidly at a stress of 45.5 MN/m$^2$ with different speeds of creep depending on the stress—the higher the stress the faster the speed of movement.

FIG. 7 also shows that at 142°C., a PEEK component will support a stress of 36.0 MN/m$^2$ without significant creep, and will creep rapidly at a stress of 39.3 MN/m$^2$.

The modulus of elasticity of PEEK at room temperature is about 3.7 GPa. The coefficient of thermal expansion of PEEK is approximately 47×10$^{-6}$/° C.

The stainless steel housings of a pipe joint will typically have a coefficient of thermal expansion of around 11×10$^{-6}$/° C. Furthermore, the outside of the stainless steel part will typically be colder than the product in the pipe, and so constrain expansion of the stainless steel parts to some extent. It is simplest therefore to assume that the stainless steel does not expand, and the errors introduced by this assumption are towards worst case, and therefore safe. The governing equations (to first approximation) are then those for simple stress strain relationships and simple linear thermal expansion:

$$\mu = \frac{\sigma}{\rho} = \frac{\frac{F}{A}}{\frac{\Delta L}{L_0}}$$

$L_\theta = (1+(\theta-\theta_0)\epsilon)L_0$ Hence $\Delta L_\theta = (\theta-\theta_0)\epsilon L_0$ Where:

| | | |
|---|---|---|
| Modulus $\mu$ | Area A | Temperature at which |
| Coefficient of thermal expansion $\epsilon$ | Rest length or designed size $L_0$ | parts have their designed |
| Stress $\sigma$ | Unconstrained expanded | size $\theta_0$ |
| Strain $\rho$ | length at working | Maximum working |
| Force F | temperature $L_a$ | temperature $\theta$ |

A seal cross section is shown in the FIG. 8, with the various dimensions and areas labelled.

The first 3 conditions below should be met for optimum sealing, though condition 3 can be relaxed at the expense of working life. Conditions 4 & 5 are needed to minimise the change of shape of the seal during its life. The amount of distortion that is acceptable is a function of hygienic requirements.

1. When the joint is cold and first assembled, the stress in area 1 should be above the elastic limit or critical stress, so that the maternal in area 1 flows to conform to the surface of the metal parts.
2. The stress throughout the working life of the seal must at all times be above the stress necessary to maintain the seal closure against the fluid pressure (this necessary stress is a multiple of the working fluid pressure, determined by experience—in our case we typically use at least 5–10 times the fluid pressure in the plastic—hence a joint designed for 10 bar might need 50–100 Bar (5–10 MPa) residual stress minimum at all times when cold).
3. The nib itself will creep, particularly when the joint is hot. The compression must therefore ideally be greater than the combined height of the two nibs—i.e. C>2 X. Hence even if the nibs creep away completely, there is still compression in the joint to maintain a liquid tight seal. If slightly less compression than this is applied, the life of the seal will be compromised to some extent (though useful life might still be obtained).
4. For minimum creep, in the main block (area 2), the compression must be such that once the nibs I have crept away completely, the stress when hot is below the critical stress: If the initial compression were higher than this, the material of the seal ring would gradually creep to the point where the stress is below the critical stress. An effective seal might be maintained, or shrinkage might result in a loss of pressure seal when cold, depending on the exact detail of the joint design. In any case, more than minimum movement would be undesirable for hygiene.
5. The height of the nibs should be as small as possible (preferably just greater than the sum of the manufacturing tolerance ranges of the two ferules and the seal ring), to minimise the initial compression required and limit the volume of creep from the nibs during the working life of the joint. Hence also the tolerances should be as close as economics allow.

Characters with a suffix of the form $\#_0$, indicate design or rest dimensions temperatures or qualities. Characters with the suffix $\#_\theta$ indicate properties at maximum working temperature. A change quantity is indicated by a $\Delta$ prefix. The critical stress is denoted by $\sigma_{critical}$. Then, considering a unit circumferential length, and assuming the radius of the seal is very large:

$$\mu = \frac{\sigma}{\rho} = \frac{\frac{F}{A}}{\frac{\Delta L}{L_0}}$$

Firstly, considering stress and strain, governed by the equation:

The inital height of the seal $height_o = 2X_0 + Z_0$

The initial compression is $C = 2\Delta X + \Delta Z$

When the joint is first assembled, there has not been time for creep to occur. For simplicity, it is assumed, because Z >>X that the stress in both Areas 1 is uniform in those areas, and that the different stress in Area 2 is substantially uniform in that area. Modulus is assumed uniform and constant. Force is a through vanable under the above assumptions. Hence the stress in the areas is given by the equations:

In area 1 $\quad \sigma_1 = \frac{F}{W} \quad$ and in area 2 $\quad \sigma_2 = \frac{F}{Y}$ hence $\quad F = \sigma_1 W = \sigma_2 Y \quad$ hence $\quad \frac{\sigma_1}{\sigma_2} = \frac{Y}{W}$ The modulus $\quad \mu = \frac{\sigma_1}{\frac{\Delta X}{X}} = \frac{\sigma_2}{\frac{\Delta Z}{Z}}$ hence $\quad \frac{\sigma_1}{\sigma_2} = \frac{\frac{\Delta X}{X}}{\frac{\Delta Z}{Z}} = \frac{Z\Delta X}{X\Delta Z} = \frac{Y}{W}$ hence $\quad \frac{\Delta X}{\Delta Z} = \frac{YX}{WZ}$ (eqn.1)

but $\quad C = 2\Delta X + \Delta Z \quad$ so $\quad \Delta Z = C - 2\Delta X$ hence $\quad \frac{\Delta X}{C - 2\Delta X} = \frac{YX}{WZ}$ so $\quad \Delta X = \frac{YX}{WZ}(C - 2\Delta X)$ hence $\quad \Delta X = \frac{YX}{WZ}C - 2\frac{YX}{WZ}\Delta X$ so $\quad \Delta X\left(1 + 2\frac{YX}{WZ}\right) = \frac{YX}{WZ}C$ hence $\quad \Delta X = \frac{\frac{YX}{WZ}C}{\left(1 + 2\frac{YX}{WZ}\right)} = \frac{\frac{YX}{WZ}C}{\left(\frac{WZ + 2YX}{WZ}\right)} = \frac{YXC}{(WZ + 2YX)}$ (eqn. 2)

Similarly, $\quad \Delta Z = \frac{WZC}{(WZ + 2YX)}$ (hint, from eqn. 1, an exercise for the student!) (eqn. 3)

Considering Condition 1
The seal is initially compressed a distance $C_0$

The modulus $\quad \mu = \dfrac{\sigma_1}{\frac{\Delta X}{X}} \quad$ and eqn. 2 states $\quad \Delta X = \dfrac{YXC}{(WZ+2YX)}$ Hence $\quad \mu = \dfrac{\sigma_1}{\frac{1}{X}\frac{YXC_0}{(WZ+2YX)}} = \dfrac{\sigma_1}{\frac{YC_0}{(WZ+2YX)}} \quad$ hence $\quad \mu\dfrac{YC_0}{(WZ+2YX)} = \sigma_1$ For flow, $\quad \mu\dfrac{YC_0}{(WZ+2YX)} > \sigma_{critical} \quad$ hence $\quad X < \dfrac{\mu C_0}{2\sigma_{critical}} = \dfrac{WZ}{2Y} \quad$ (Condition 1)

Considering condition 3

As is stated previously $\quad X < \dfrac{C_0}{2} \quad$ (Condition 3)

Considering conditions 2 and 4
Assuming that condition 3 is met, the nibs will tend to sink into the body of the seal. Again assuming that the stainless steel parts to not change size with heat (see above), then (assuming the cross section of the nibs is small, so does not add significantly to the area of area 2):

Initial height of the recess $\quad H_0 = Z + 2X - C_0$

Hence the compression of the block when cold $\quad C_{z_0} = Z - H_0 = Z - Z - 2X + C_0 = C_0 - 2X$ Considering now the thermal expansion of the part: $\quad L_\theta = (1 + (\theta - \theta_0)\varepsilon)L_0$ Rest length $\quad L_0 = Z$ Unconstrained length at maximum working temperature $\quad L_\theta = (1 + (\theta - \theta_0)\varepsilon)(Z)$ Hence maximum compression of the block when hot $\quad C_{z_0} = C_0 - 2X + (\theta - \theta_0)\varepsilon Z$ For Condition 2
The stress when cold must be greater than an empirically determined multiple (Q) of the working pressure within the pipeline ($P_{line}$), hence:

The compression when cold $\quad C_{z_0} = C_0 - 2X$

The modulus $\quad \mu = \dfrac{\sigma_2}{\frac{\Delta Z}{Z}} = \dfrac{\sigma_2}{\frac{C_0 - 2X}{Z}}$ Hence the stress $\quad \sigma_2 = \mu C_0 - \dfrac{2X}{Z} > QP_{line}$ Or, in terms of initial compression $\quad C_0 > \dfrac{QP_{line}Z}{\mu} + 2X \quad$ (Condition 2)

For Condition 4
The stress when hot should ideally be less than the critical stress maximum compression when hot is given by $\quad C_{z_0} = C_0 - 2X + (\theta - \theta_0)\varepsilon Z$ The modulus $\quad \mu = \dfrac{\sigma_2}{\frac{\Delta Z}{Z}} = \dfrac{\sigma_2}{\frac{C_0 - 2X + (\theta - \theta_0)\varepsilon Z}{Z}}$ Hence the stress $\quad \sigma_2 = \mu C_0 - 2X + \dfrac{(\theta - \theta_0)\varepsilon Z}{Z} < \sigma_{critical}$ Or, in terms of initial compression $\quad C_0 < \dfrac{Z\sigma_{critical}}{\mu} + 2X - (\theta - \theta_0)\varepsilon Z \quad$ (Condition 4)

What is claimed as new and desired to be protected by Letters Patent of the United States is:

1. An apparatus for use in a hygienic food processing system, comprising:
   a gasket made substantially of engineering plastics material, wherein said engineering plastics material is selected to be resistant to creep during said gasket's use in said hygienic food processing system, wherein the gasket comprises:
   a bore surface for providing a transition from a first joint part to a second joint part at a demountable joint of said hygienic food processing system; and
   a side defining a seal surface, adjacent the bore surface, for abutting at least one of said first and second joint parts, wherein said seal surface deforms in use to define a plateau and is positioned on a nib which extends from a body of the gasket, which in use produces an hygienic seal.

2. An apparatus as claimed in claim 1, wherein the seal surface includes a deformable ridge for mating with imperfections in a joint part during production of the hygienic seal.

3. An apparatus as claimed in claim 1, wherein the engineering plastics material has a tensile strength of between about 100–200 MPa and an elongation of about 3–100%, thereby giving a tensile modulus in the range of about 2400–10,000 MPa.

4. An apparatus as claimed in claim 1, wherein the engineering plastics material is selected from the group consisting of:
   a polyetheretherketone (PEEK);
   a polyethersulfone (PES);
   TORLON;
   a polyimide; and
   a polycarbonate.

5. An apparatus as claimed in claim 1, wherein said nib is substantially annular.

6. An apparatus as claimed in claim 5, wherein said nib is shaped and sized to exhibit creep during assembly of a joint.

7. An apparatus as claimed in claim 6, wherein the body is shaped and sized to remain resilient throughout the lifetime of the gasket.

8. An apparatus as claimed in claim 6, wherein a radial width of said seal surface is less than 50% of a radial width of the body of the gasket.

9. An apparatus as claimed in claim 8, wherein the radial width of said seal surface is approximately 20% of the radial width of the body of the gasket.

10. An apparatus as claimed in claim 1, wherein said hygienic seal is formed at least in part through compression of said nib.

11. An apparatus as claimed in claim 1, wherein the engineering plastics is resistant to creep up to 140° C.

12. A pipe joint of an hygienic food processing system comprising:
   a first pipe end;
   a second pipe end; and
   a gasket having a seal surface disposed annular to and adjacent a bore hole of said gasket, wherein said seal surface is compressed between the first and second pipe ends such that deformation of said seal surface defines a plateau on a nib which results in an hygienic seal being produced between the gasket and the first and second pipe ends, wherein said gasket is made substantially of engineering plastics material, and wherein said engineering plastics material is selected to be resistant to creep during said gasket's use in said hygienic food processing system.

13. A pipe joint as claimed in claim 12, wherein said seal surface includes a deformable ridge for mating with imperfections in a pipe end during production of the hygienic seal.

14. A pipe joint as claimed in claim 12, wherein the pipe ends are urged together by means of flanges fastened onto the outsides of the pipes, so that material flowing in the pipe only contacts the pipe walls and the gasket.

15. A pipe joint as claimed in claim 14, wherein alignment of the pipe ends is controlled by the flanges.

16. A pipe joint as claimed in claim 14, wherein the flanges are drawn together by means of a screw thread.

17. A pipe joint as claimed in claim 14, wherein an inside surface of a flange assists in aligning the gasket.

18. A pipe joint as claimed in claim 14, wherein at least one cavity is provided in the flanges into which the gasket can expand during use, if necessary.

* * * * *